(12) United States Patent
Wu et al.

(10) Patent No.: US 10,116,428 B2
(45) Date of Patent: Oct. 30, 2018

(54) ECHO CANCELLATION FOR HIGH SPEED FULL DUPLEX DATA TRANSMISSIONS

(71) Applicant: Lattice Semiconductor Corporation, Portland, OR (US)

(72) Inventors: Qiming Wu, Shanghai (CN); Kai Lei, Shanghai (CN); Fei Song, Shanghai (CN); Kai Zhou, Shanghai (CN); Gijung Ahn, San Jose, CA (US); Zhi Wu, Shanghai (CN); Min-Kyu Kim, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 113 days.

(21) Appl. No.: 15/312,149

(22) PCT Filed: May 20, 2014

(86) PCT No.: PCT/CN2014/077861
§ 371 (c)(1),
(2) Date: Nov. 17, 2016

(87) PCT Pub. No.: WO2015/176224
PCT Pub. Date: Nov. 26, 2015

(65) Prior Publication Data
US 2017/0085359 A1  Mar. 23, 2017

(51) Int. Cl.
*H04L 5/14* (2006.01)
*H04B 3/23* (2006.01)
*H04B 3/30* (2006.01)

(52) U.S. Cl.
CPC .......... *H04L 5/1461* (2013.01); *H04B 3/23* (2013.01); *H04B 3/30* (2013.01)

(58) Field of Classification Search
None
See application file for complete search history.

(56) References Cited

U.S. PATENT DOCUMENTS

| 6,344,756 B1* | 2/2002 | Cecchi | H04B 3/23 326/26 |
| 2003/0142688 A1* | 7/2003 | Chou | H04B 3/23 370/420 |

(Continued)

FOREIGN PATENT DOCUMENTS

| CN | 202035056 U | 11/2011 |
| CN | 202587132 U | 12/2012 |
| EP | 1467547 A2 | 10/2004 |

OTHER PUBLICATIONS

PCT International Search Report and Written Opinion, PCT/CN2014/077861 dated Nov. 28, 2014, 12 Pages.

*Primary Examiner* — George C Atkins
(74) *Attorney, Agent, or Firm* — Fenwick & West LLP

(57) ABSTRACT

Systems, devices and methods for analog echo cancellation for high speed full duplex data transmissions, which include a first set of differential nodes to receive reception data and transmission data, a second set of differential nodes to receive the transmission data, and a subtraction circuit to receive data from the first set of differential nodes and data from the second set of differential nodes. The subtraction circuit includes a plurality of capacitors to receive data from each of the first and second sets differential nodes, and a termination circuit for providing DC termination voltage to subtract the data of the second set of differential nodes from the data of the first set of differential nodes to eliminate echo from the reception data received at the first set differential nodes.

19 Claims, 6 Drawing Sheets

(56) References Cited

U.S. PATENT DOCUMENTS

| | | | | |
|---|---|---|---|---|
| 2004/0032911 A1* | 2/2004 | Wu | ................ | H04B 3/23 |
| | | | | 375/285 |
| 2011/0096848 A1* | 4/2011 | Lam | ................ | H04L 25/0272 |
| | | | | 375/257 |
| 2014/0225669 A1* | 8/2014 | Zhong | ................ | H03F 3/45197 |
| | | | | 330/254 |

* cited by examiner

ECHO CANCELLATION FOR HIGH SPEED FULL DUPLEX DATA TRANSMISSIONS

TECHNICAL FIELD

Embodiments of the invention generally relate to the field of electronic circuits, and, more particularly, to echo cancellation analog circuits.

BACKGROUND

For devices capable of bi-directional data transmission/reception, effective echo cancellation is needed to split received data from the data to be transmitted. Ethernet echo cancellation solutions are an example of high-speed echo cancellation methods. These solutions cancel echo signals digitally—i.e., analog-to-digital converters (ADCs) are used to convert input data, and the digital output is optimized via echo cancellation solutions. These solutions have speed and bandwidth limitations, due to the use of ADCs.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Embodiments of the invention describe systems, devices and methods for analog echo cancellation for high speed full duplex data transmissions. Embodiments include a first set differential nodes to receive reception data and transmission data, a second set of differential nodes to receive the transmission data, and a subtraction circuit to receive data from the first set of differential nodes and data from the second set of differential nodes. The subtraction circuit includes a plurality of capacitors to receive data from each of the first and second sets differential nodes, and a termination circuit for providing DC termination voltage to subtract the data of the second set of differential nodes from the data of the first set of differential nodes to eliminate echo from the reception data received at the first set differential nodes.

DETAILED DESCRIPTION

Embodiments of an apparatus, system and method for utilizing echo cancellation circuits for high speed full duplex data transmissions are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
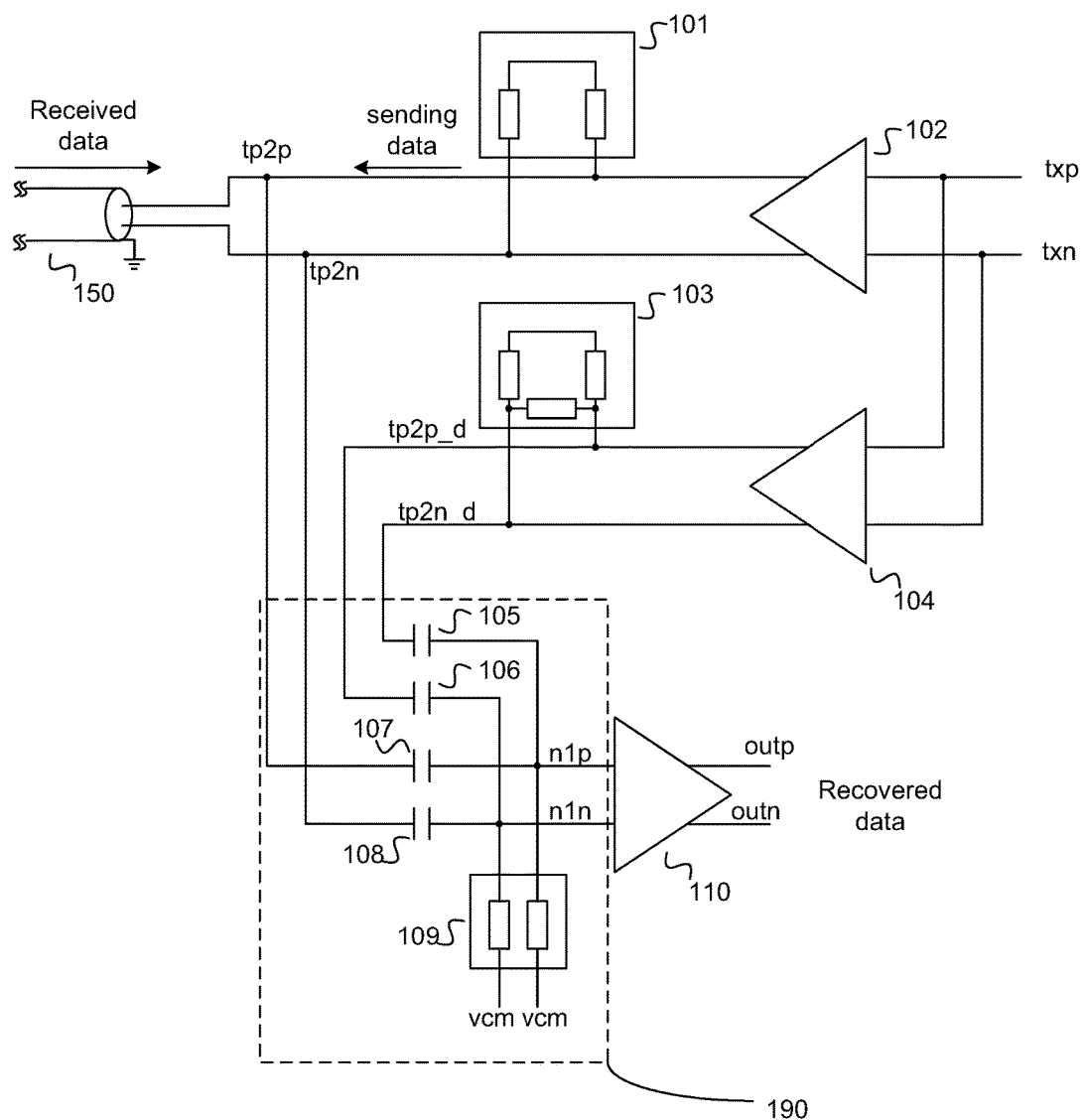
FIG. 1 is an illustration of an echo cancellation circuit according to an embodiment of the invention.

FIG. 1 is an illustration of an echo cancellation circuit according to an embodiment of the invention. FIG. 1 illustrates circuit 100 including first termination circuit 101, first driver 102, second (referred to herein for this embodiment as "dummy") termination circuit 103, second (dummy) driver 104, capacitors 105-108, filter circuit 110, and input termination 109 (for filter circuit 110).

In this embodiment, reception data is received via cable 150, while transmission data is asserted via first driver 102 and first termination circuit 101 (which is used to match the impedance of cable 150 to eliminate potential signal reflections). Differential nodes tp2$p$ (positive) and tp2$n$ (negative) are shown to receive both the reception data and the transmission data. Transmission data is also received at differential nodes tp2$p\_d$ and tp2$n\_d$ via second/dummy driver 104 and second/dummy termination circuit 103. The transmission data driven via both first driver 102 and dummy driver 104 originates from nodes txp and txn.

In this embodiment, an analog capacitor subtractor is utilized to implement analog echo cancellation, as opposed to prior art analog-to-digital converter (ADC) or digital signal processor (DSP)-based solutions. Analog subtractor 190 is shown to comprise capacitors 105-108 and termination circuit 109. In this embodiment, capacitors 105 and 106 both have the same value and capacitors 107 and 108 both have the same value, where capacitors 105 and 106 receive the "dummy" transmission data from nodes tp2$p\_d$ and tp2$n\_d$, while capacitors 107 and 108 receive the transmission data from nodes tp2$p$ and tp2$n$.

The outputs of capacitors 105 and 107 are combined at n1$p$, and the outputs of capacitors 106 and 108 are combined at node n1$n$. Input termination 109 provides a dc voltage (vcm) for nodes n1$p$ and n1$n$. At nodes n1$p$ and n1$n$, dummy transmission data is subtracted from the combined transmission/reception data signal, and the resulting data is thus echo cancelled received data (i.e., the data received via cable 150). In this embodiment, filter circuit 110 is connected to nodes n1$p$ and n1$n$ to filter glitches due to, for example, differences between first driver 102 and dummy driver 104.

Figure 2:
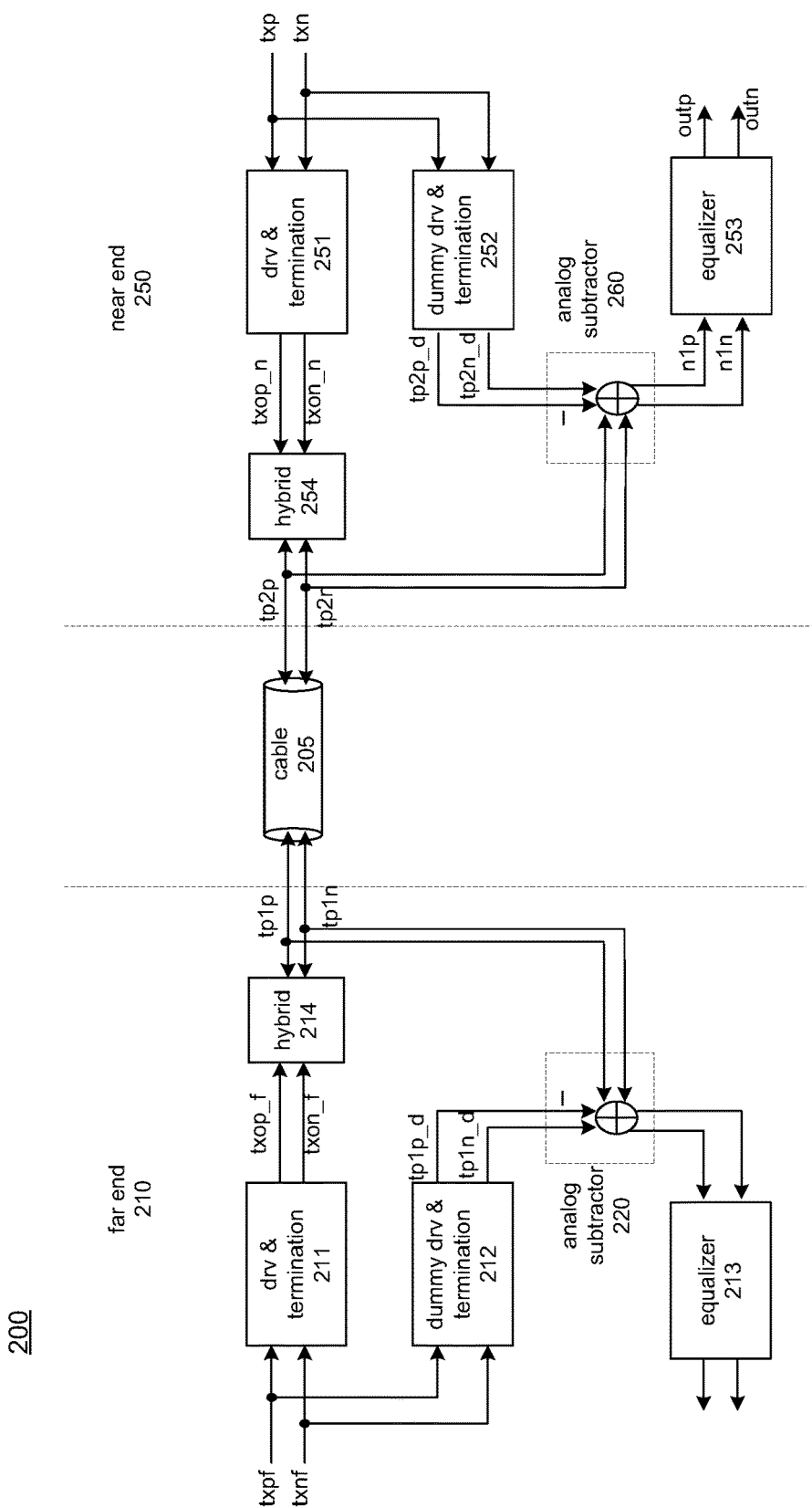
FIG. 2 is an illustration of a full duplex device utilizing echo cancellation circuits according to an embodiment of the invention.

FIG. 2 is an illustration of a full duplex device utilizing echo cancellation circuits according to an embodiment of the invention. In this embodiment, device 200 is shown to include far end component 210 (i.e., receiving component) and near end component 250 (i.e., transmission component) communicatively coupled via cable 205. As referred to herein, a "full duplex" device describes a device that allows for simultaneous bi-directional communication; a primary problem of full duplex devices is undesired feed-through of the transmitted data signal into the receive through hybrid transformers wherein echoes from the opposing component are to be eliminated.

Far end component 210 is shown to include first driver and termination circuit 211, second/dummy driver and termination circuit 212, filter 213, hybrid transformer 214, and analog subtractor 220; near end component 250 is shown to similarly include first driver and termination circuit 251, second/dummy driver and termination circuit 252, filter 252, hybrid transformer 254, and analog subtractor 260.

In this embodiment, analysis and calculations at far end component 210 and near end component 250 are symmetric. For near end component 250, near end driver and termination circuit 251 and second/dummy driver and termination circuit 252 have a common input source—V(txp, txn). Signals at nodes txop_n and txon_n are equivalent to signals at node tp2_d and tp2n_d.

For a full duplex data transmission configuration such as device 200, the signals txop_n and txon_n signals cannot normally be obtained directly. Embodiments of the invention utilize the above described dummy driver and termination circuits to obtain these signals indirectly.

Hybrid transformer 254 modulates signals txop_n and txon_n. The outputs of hybrid transformer 254 (tp2p, tp2n) and dummy driver and termination circuit 252 are inputs for analog subtractor 260. The output of analog substractor 260 (n1p, n1n) is an echo-canceled data which is equivalent to the data from far end first driver and termination circuit 211 V(txop_f, txon_f) multiplied by cable loss from cable 205.

In this embodiment, if there are mismatches between the first and second/dummy drivers, there may also be mismatches between the first and dummy termination circuits, and thus the rise and fall time of (txop_n, txon_n) may be different that the rise and fall time of (tp2p_d, tp2n_d).

Figure 3:
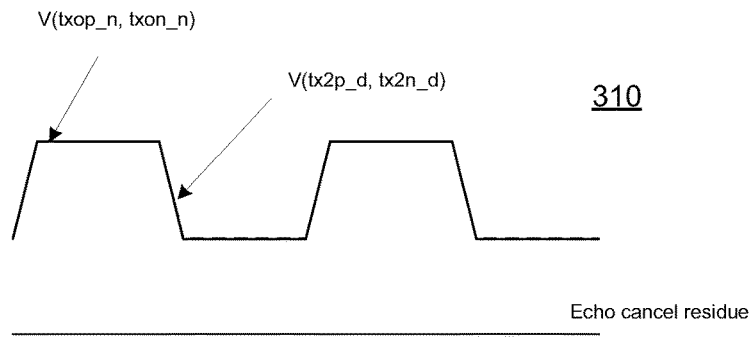
FIG. 3 illustrates several different possible mismatches between rise and fall times between first and second/dummy driver and termination circuits according to embodiments of the invention.
Figure 3:
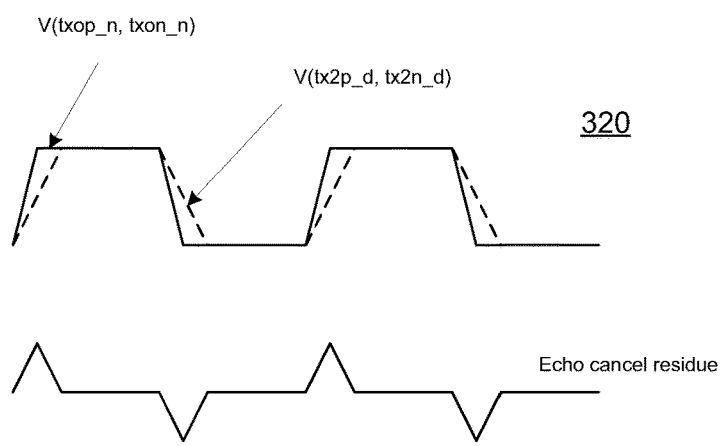
Figure 3:
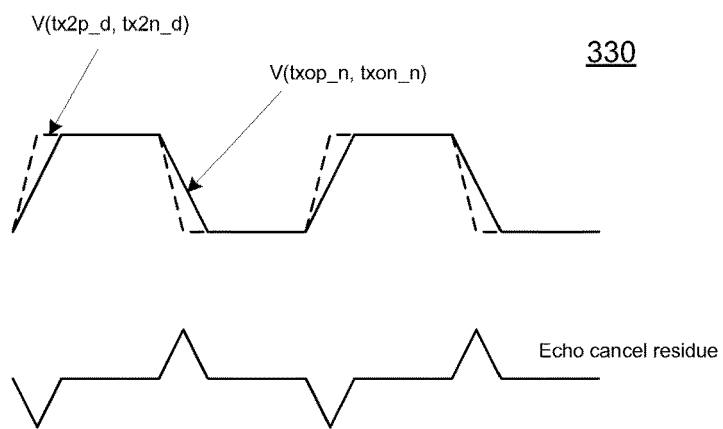

FIG. 3 illustrates several different possible mismatches between rise and fall times between first and second/dummy driver and termination circuits according to embodiments of the invention. Referring back to the signals illustrated in FIG. 2, graph set 310 illustrates a scenario where there is no mismatch between the rise and fall time for (txop_n, txon_n) and the rise and fall time for (tp2p_d, tp2n_d); thus, the echo cancel residue is shown to be zero.

In graph sets 320 and 330, the echo cancel residue is illustrated as a non-zero signal due to the respective illustrated mismatches between the rise and fall time for (txop_n, txon_n) and the rise and fall time for (tp2p_d, tp2n_d). The echo cancel residue is shown to comprise glitches; in some embodiments, a filter is utilized to filter these glitches. For example, when these glitches are in high frequency, the corresponding filter has a high frequency attenuation for the signals.

Figure 4:
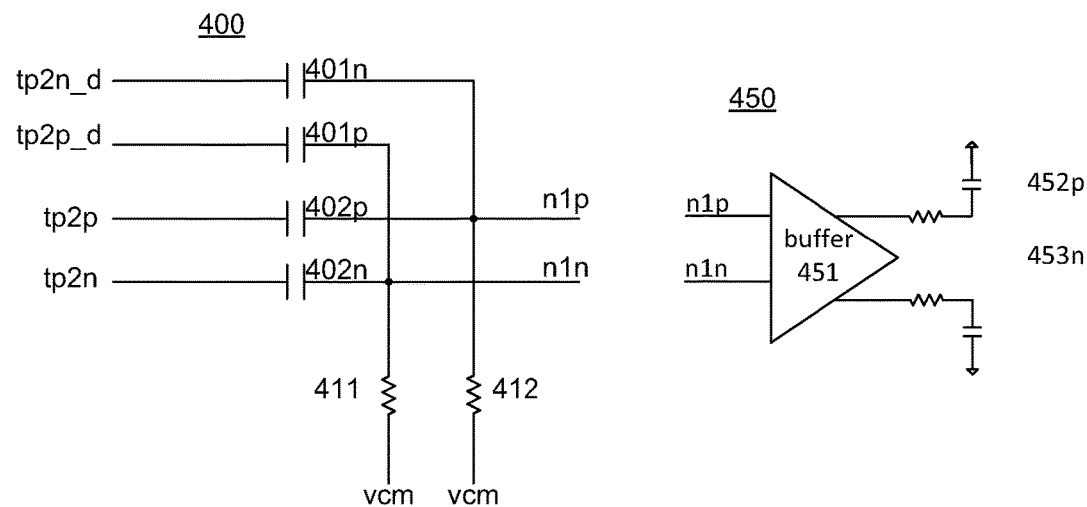
FIG. 4 is an illustration of an analog subtractor according to an embodiment of the invention.

FIG. 4 is an illustration of an analog subtractor according to an embodiment of the invention. In this embodiment, subtractor 400 is used in device 200 of FIG. 2 and is shown to include capacitors 401n to receive signal tp2n_d, 401p to receive signal tp2p_d, 402p to receive signal tp2p, 402n to receive signal tp2n, terminal resistor 411 to receive signals from capacitors 401p and 402n, and terminal resistor 412 to receive signals from capacitors 401n and 402p. In some embodiments, capacitors 401p and 401n both have the same value and capacitors 402p and 402n both have the same value; capacitors 401p and 402p may have the same value or differing values.

Referring back to FIG. 2, equations for signals tp1 and tp2 may be expressed as follows (note that Gcl is cable loss from cable 205, Vrn is the near end residue for near end component 250, and Vrf is the far end residue for far end component 210):

$$V(tp2p, tp2n) = V(txop\_f, txon\_f)*Gcl + V(txop\_n, txon\_n) + vrn$$

$$V(tp1p, tp1n) = V(txop\_n, txon\_n)*Gcl + V(txop\_f, txon\_f) + vrf$$

In this embodiment, for subtractor 400 C0 is the value for capacitors 401n and 401p, C1 is the value of capacitors 402p and 402n, and Zcm is the impedance resistors 411 and 412, which function as input termination of the filter circuit (not shown). The transfer function for subtractor 400 may be expressed as:

$$V(n1p, n1n) = \frac{S*Z\,cm*C1}{S*Z\,cm*(C0+C1)+1}\left(V(tp2p, tp2n) - \frac{C0}{C1}V(tp2p_d, tp2n_d)\right)$$

Filter 450 includes buffer 451 and capacitors outp and outn. This buffer stage may process the subtracted signal. In some embodiments, filter 450 comprises a linear equalizer to boost the signal and filter out echo noise. In embodiments of the invention, filter 450 may comprise a band-pass filter (BPF) or a low-pass filter (LPF).

Figure 5:
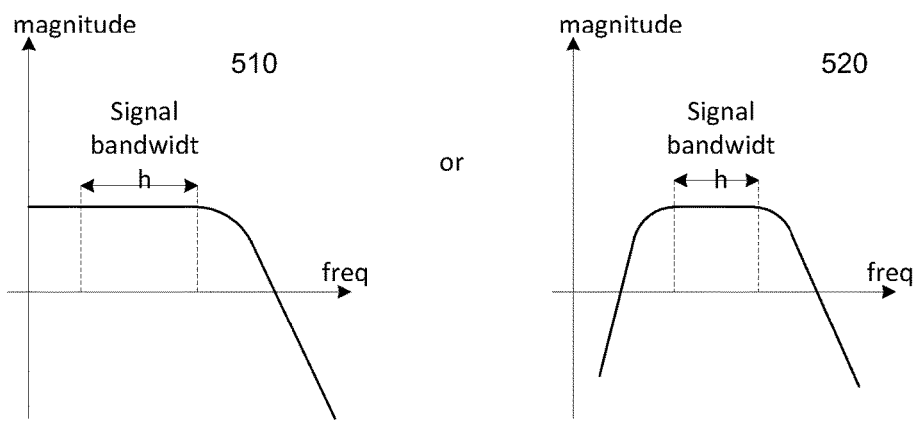
FIG. 5 is an illustration of a filter circuit's AC response curve according to an embodiment of the invention.

FIG. 5 is an illustration of a filter circuit's AC response curve according to an embodiment of the invention. In this embodiments, AC response curves 510 and 520 may represent the response curve for filter 450 of FIG. 4. Said filter can be a low pass filter having response curve 510, or a band pass filter having response curve 520. The filter provides a gain win in signal bandwidth and has an attenuation in high frequency out of signal bandwidth.

Referring back to near-end component 210 of FIG. 2, the signal at node outp and outn may be described by the following equation (note that Hfilter is transfer function of the filter; Vrn can be attenuated by Hfilter and V(txop_f, txon_f)*Gcl may be enlarged):

$$V(outp, outn) = Hfilter * \frac{S*Z\,cm*C1}{S*Z\,cm*(C0+C1)+1}(V(txop\_f, txon\_f)*Gcl*vrn)$$

Figure 6:
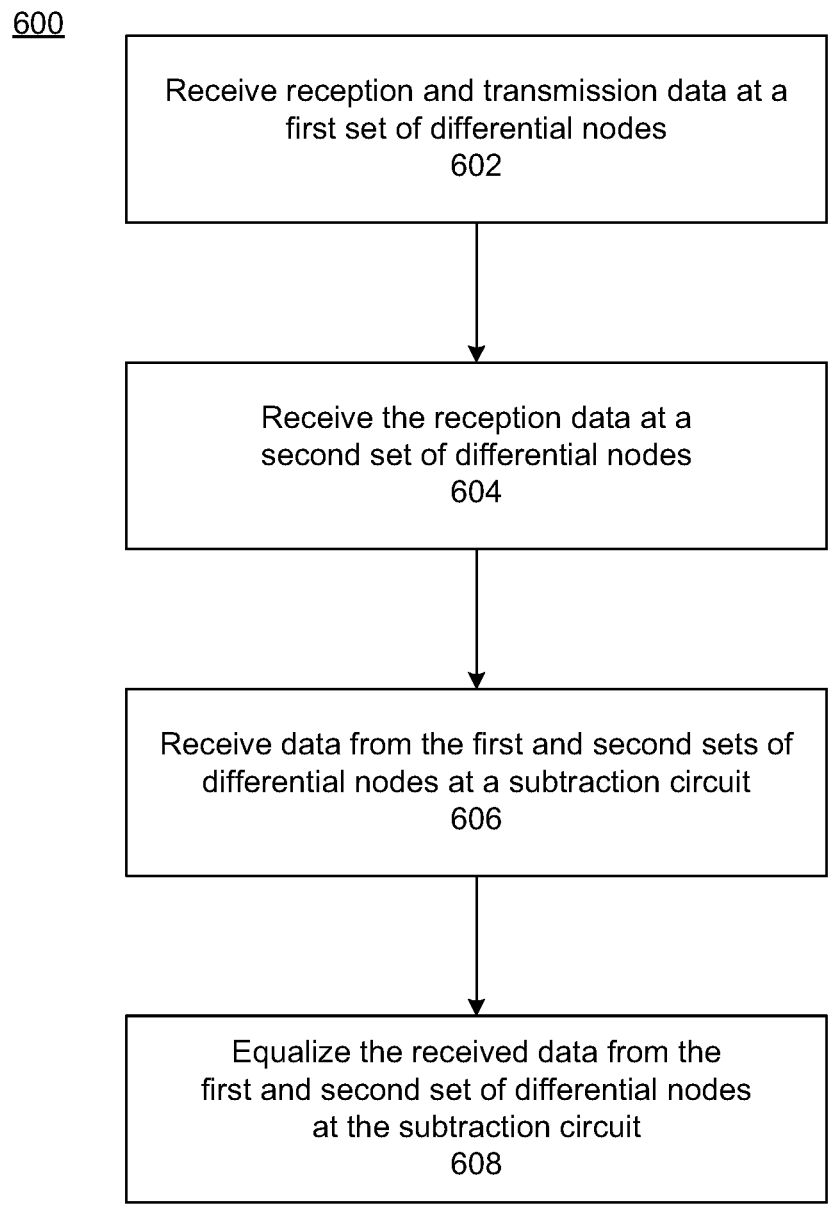
FIG. 6 is a flow diagram of a process for echo cancellation according to an embodiment of the invention.

FIG. 6 is a flow diagram of a process for echo cancellation according to an embodiment of the invention. Process flows as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the disclosure; thus, not all actions are required in every implementation. Other process flows are possible.

Process 600 includes operations for receiving reception data and transmission data at a first set differential nodes, 602, and receiving the transmission data at a second set of differential nodes, 604. The transmission and reception data may comprise at least one of high definition audio or video data. In some embodiments, the transmission data received at the first and second set of differential nodes is received from first and second drivers, respectively.

Data from the first set of differential nodes and data from the second set of differential nodes are received at a subtraction circuit, 606. As described above, the subtraction circuit receives data from each of the first and second sets differential nodes, and includes a termination circuit for providing DC termination voltage to subtract the data of the second set of differential nodes from the data of the first set of differential nodes to eliminate echo from the reception data received at the first set differential nodes.

The received data from the first set of differential nodes and data from the second set of differential nodes is subsequently equalized at the subtraction circuit, 608. In some embodiments, the received data from the first set of differential nodes and data from the second set of differential nodes at the subtraction circuit is equalized to compensate for cable loss of the reception data.

Figure 7:
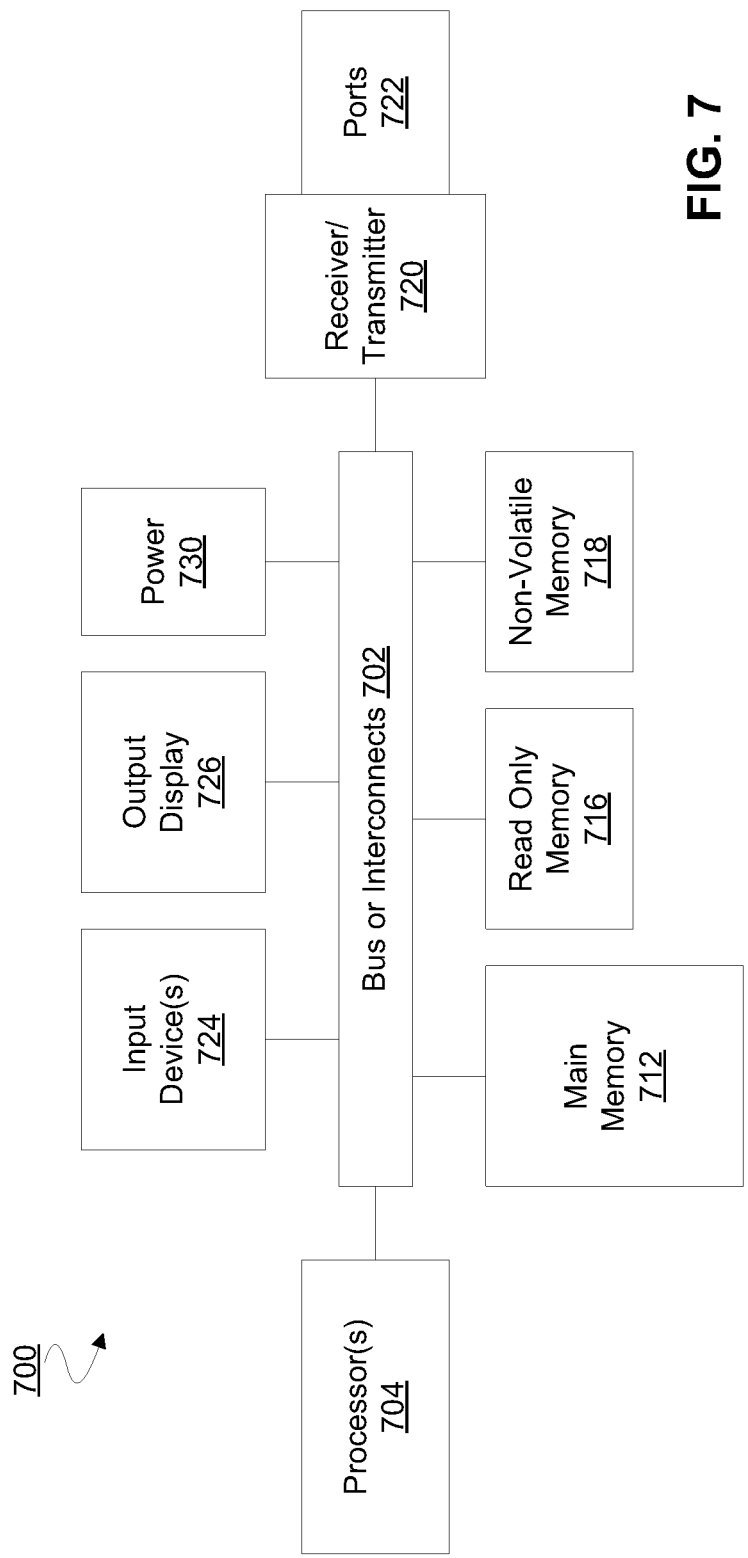
FIG. 7 is an illustration of an apparatus or system including logic utilize echo cancellation circuits according to an embodiment of the invention.

FIG. 7 is an illustration of an apparatus or system including logic utilize echo cancellation circuits according to an embodiment of the invention. In this illustration, certain standard and well-known components that are not germane to the present description are not shown. In some embodiments, the apparatus or system 700 (referred to herein generally as an apparatus) comprises a bus or interconnects 702 or other communication means for transmission of data. The apparatus 700 may include a processing means, such as one or more processors 704 coupled with the interconnect 702 for processing information. The processors 704 may comprise one or more physical processors and one or more logical processors. The bus or interconnect 702 is illustrated as a single interconnect for simplicity, but may represent multiple different interconnects or buses and the component connections to such interconnects may vary. The interconnect 702 shown in FIG. 7 is an abstraction that represents any one or more separate physical buses, point to point connections, or both connected by appropriate bridges, adapters, or controllers.

In some embodiments, the apparatus 700 further comprises a random access memory (RAM) or other dynamic storage device or element as a main memory 712 for storing information and instructions to be executed by the processors 704. RAM memory may include dynamic random access memory (DRAM). In some embodiments, memory of the apparatus may further include certain registers or other special purpose memory.

The apparatus 700 may include a read only memory (ROM) 716 or other static storage device for storing static information and instructions for the processors 704. The apparatus 700 may include one or more non-volatile memory elements 718 for the storage of certain elements, including, for example, flash memory, hard disk drive, or solid-state drive.

One or more transmitters or receivers 720 may also be coupled to the interconnect 702. In some embodiments, the receivers or transmitters 720 may be coupled to one or more ports 722, where the ports may include, for example, one or more HDMI™ (High-Definition Multimedia Interface) ports, one or more MHL™ (Mobile High-Definition Link) ports, one or more DVI ports and/or the like.

In some embodiments, the apparatus 700 includes one or more input devices 724, where the input devices include one or more of a keyboard, mouse, touch pad, voice command recognition, gesture recognition, or other device for providing an input to a computing system. The apparatus 700 may also be coupled via the interconnect 702 to an output device 726. In some embodiments, the display 726 may include a liquid crystal display (LCD) or any other display technology, for displaying information or content to a user. In some environments, the display 726 may include a touch screen that is also utilized as at least a part of an input device. In some environments, the display 726 may be or may include an audio device, such as a speaker for providing audio information. The apparatus 700 may also comprise a power device or apparatus 730, which may comprise a power supply, a battery, a solar cell, a fuel cell, or other system or device for providing or generating power. The power provided by the power device or system 730 may be distributed as required to elements of the apparatus 700.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable non-transitory storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

The invention claimed is:

1. An apparatus comprising:
a first set of differential nodes to receive a reception data and a transmission data;
a second set of differential nodes to receive the transmission data; and
a subtraction circuit to receive data from the first set of differential nodes and data from the second set of differential nodes, the subtraction circuit further comprising:
a plurality of capacitors to receive data from each of the first and second sets of differential nodes, wherein inputs of a first pair of the capacitors are coupled to the second set of differential nodes and inputs of a second pair of the capacitors are coupled to the first set of differential nodes; and
a termination circuit for providing DC termination voltage to subtract the data of the second set of differential nodes from the data of the first set of differential nodes to eliminate echo from the reception data received at the first set of differential nodes, wherein an output of a first capacitor from the first pair and an output of a first capacitor from the second pair are coupled to a first node of the termination circuit, and an output of a second capacitor from the first pair and an output of a second capacitor from the second pair are coupled to a second node of the termination circuit.

2. The apparatus of claim 1, further comprising first and second drivers to drive the transmission data to the first and second sets of differential nodes, respectively.

3. The apparatus of claim 2, further comprising:
a filter circuit to equalize the received data from the first set of differential nodes and data from the second set of differential nodes at the subtraction circuit.

4. The apparatus of claim 3, wherein equalizing the received data from the first set of differential nodes and data from the second set of differential nodes at the subtraction circuit is to compensate for differences between the first and second drivers.

5. The apparatus of claim 3, wherein the filter circuit is further configured to boost gain and reduce attenuation in signal bandwidth.

6. The apparatus of claim 1, wherein the termination circuit comprises one or more resistive components to prevent data signal reflection.

7. The apparatus of claim 1, wherein the transmission and reception data comprises at least one of high definition audio or video data.

8. A method comprising:
receiving a reception data and a transmission data at a first set of differential nodes;
receiving the transmission data at a second set of differential nodes; and
receiving data from the first set of differential nodes and data from the second set of differential nodes at a subtraction circuit, the subtraction circuit including:
a plurality of capacitors for receiving data from each of the first and second sets of differential nodes, wherein inputs of a first pair of the capacitors are coupled to the second set of differential nodes and inputs of a second pair of the capacitors are coupled to the first set of differential nodes; and
a termination circuit for providing DC termination voltage to subtract the data of the second set of differential nodes from the data of the first set of differential nodes to eliminate echo from the reception data received at the first set of differential nodes, wherein an output of a first capacitor from the first pair and an output of a first capacitor from the second pair are coupled to a first node of the termination circuit, and an output of a second capacitor from the first pair and an output of a second capacitor from the second pair are coupled to a second node of the termination circuit.

9. The method of claim 8, further comprising:
equalizing the received data from the first set of differential nodes and data from the second set of differential nodes at the subtraction circuit.

10. The method of claim 9, wherein equalizing the received data from the first set of differential nodes and data from the second set of differential nodes at the subtraction circuit is to compensate for cable loss of the reception data.

11. The method of claim 8, wherein the transmission data received at the first and second set of differential nodes is received from first and second drivers, respectively.

12. The method of claim 8, wherein the transmission and reception data comprises at least one of high definition audio or video data.

13. A system comprising:
a first device; and
a second device, operatively coupled to the first device to exchange multimedia data, wherein the first and second devices each include:
a first set of differential nodes to receive a reception data and a transmission data;
a second set of differential nodes to receive the transmission data; and
a subtraction circuit to receive data from the first set of differential nodes and data from the second set of differential nodes, the subtraction circuit further comprising:
a plurality of capacitors for receiving data from each of the first and second sets of differential nodes, wherein inputs of a first pair of the capacitors are coupled to the second set of differential nodes and inputs of a second pair of the capacitors are coupled to the first set of differential nodes; and
a termination circuit for providing DC termination voltage to subtract the data of the second set of differential nodes from the data of the first set of differential nodes to eliminate echo from the reception data received at the first set of differential nodes, wherein an output of a first capacitor from the first pair and an output of a first capacitor from the second pair are coupled to a first node of the termination circuit, and an output of a second capacitor from the first pair and an output of a second capacitor from the second pair are coupled to a second node of the termination circuit.

14. The system of claim 13, wherein the first and second devices further include:
an equalization circuit to equalize the received data from the first set of differential nodes and data from the second set of differential nodes at the subtraction circuit.

15. The system of claim 14, wherein the first and second devices are communicatively coupled via a cable, and equalizing the received data from the first set of differential nodes and data from the second set of differential nodes at the subtraction circuit is to compensate for cable loss of the reception data.

16. The system of claim 15, wherein the cable includes at least one of a Mobile High-Definition Link (MHL) connector or a High Definition Multimedia Interface (HDMI) connector.

17. The system of claim 13, wherein the first and second devices further include:
first and second drivers to drive the transmission data to the first and second sets of differential nodes, respectively.

18. The system of claim 13, wherein the transmission and reception data comprises at least one of high definition audio or video data.

19. The system of claim 13, wherein the first device comprises a display panel and the second device comprises a mobile computing device.

* * * * *